US011059114B2

(12) United States Patent
Karlsson (10) Patent No.: US 11,059,114 B2
(45) Date of Patent: Jul. 13, 2021

(54) DUST REMOVAL ARRANGEMENT FOR AN ENGINE-DRIVEN TOOL (71) Applicant: HUSQVARNA AB, Huskvarna (SE)

(72) Inventor: Fredrik Karlsson, Sävedalen (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/347,260

(22) PCT Filed: Nov. 1, 2017

(86) PCT No.: PCT/SE2017/051075
§ 371 (c)(1),
(2) Date: May 3, 2019

(87) PCT Pub. No.: WO2018/084784
PCT Pub. Date: May 11, 2018

(65) Prior Publication Data
US 2019/0275596 A1    Sep. 12, 2019

(30) Foreign Application Priority Data
Nov. 3, 2016  (SE) ..................... 1651451-5

(51) Int. Cl.
B23D 59/00       (2006.01)
B23Q 11/08       (2006.01)
(Continued)

(52) U.S. Cl.
CPC ........... *B23D 59/006* (2013.01); *B23D 47/12* (2013.01); *B23Q 11/0825* (2013.01); *B28D 1/04* (2013.01); *B28D 7/02* (2013.01)

(58) Field of Classification Search
CPC ... Y10T 83/207; Y10T 83/606; Y10T 83/613; Y10T 83/732; Y10T 83/734;
(Continued)

(56) References Cited

U.S. PATENT DOCUMENTS 3,613,748 A * 10/1971 De Pue ................. B27G 19/04
30/391
3,998,121 A * 12/1976 Bennett ............... B23D 45/044
83/471.3
(Continued)

FOREIGN PATENT DOCUMENTS

CN       101505899 A    8/2009
CN       104827342 A    8/2015
(Continued)

OTHER PUBLICATIONS

International Type Search Report for Swedish Application No. 1651451-5 dated Nov. 23, 2017.
(Continued)

*Primary Examiner* — Phong H Nguyen
(74) *Attorney, Agent, or Firm* — Burr & Forman, LLP (57) ABSTRACT The present disclosure relates to engine-driven tool (1) comprising a rotatable work tool (2) and an engine (4) for propelling a first driving pulley (28) via a clutch wheel (30) comprised in a power transferring unit (27) and having an outer edge. The first driving pulley (28) and the clutch wheel (30) are arranged to rotate around a common driving axis (38). The power transferring unit (27) comprises an endless drive belt (9) that is arranged propel the rotatable work tool (2) when the first driving pulley (28) is propelled. A fan arrangement (13) is arranged to convey air front a dust channel (11) formed between a shielding cover (8) and the rotatable work tool (2), and comprises a fan turbine (26) that is connected to a fan pulley (29) connected to the drive belt (9) is arranged to propel the fan pulley (29). A first overlap line (50) extends along the outer edge (52) of the clutch wheel (30), perpendicular to the extension of the common driving axis (38), the first overlap line (50) further extending via the fan turbine (26).

20 Claims, 9 Drawing Sheets (51) Int. Cl.
*B23D 47/12* (2006.01)
*B28D 1/04* (2006.01)
*B28D 7/02* (2006.01)

(58) Field of Classification Search
CPC .... Y10T 83/735; B23D 47/12; B23D 59/006; B23D 59/00; B28D 7/02; B28D 7/00; B28D 1/04; B28D 1/02; B23Q 11/0825; B23Q 11/0833; B23Q 11/0841; B27G 19/00; B27G 19/02; B27G 19/04; B27G 3/00; B26D 7/18; B26D 7/1854; B26D 7/1863; B26D 2007/0018; B24B 23/00
USPC ....... 451/442, 451, 453, 456, 457; 30/166.3, 30/514, 516, 390, 391
See application file for complete search history.

(56) References Cited

U.S. PATENT DOCUMENTS

| | | | | |
|---|---|---|---|---|
| 4,028,975 | A * | 6/1977 | Bennett | B23D 45/042 |
| | | | | 83/397 |
| 5,537,748 | A | 7/1996 | Takahashi et al. | |
| 6,014,811 | A | 1/2000 | Taomo et al. | |
| 6,039,037 | A | 3/2000 | Taomo et al. | |
| 6,155,246 | A | 12/2000 | Yamami et al. | |
| 6,233,831 | B1 | 5/2001 | Iida et al. | |
| 6,318,352 | B1 * | 11/2001 | Gnazzo | B23D 59/006 |
| | | | | 125/12 |
| 2004/0060407 | A1 * | 4/2004 | Kao | B27G 19/02 |
| | | | | 83/397 |
| 2008/0209739 | A1 | 2/2008 | Saitoh | |
| 2010/0043768 | A1 * | 2/2010 | Yokota | B27B 9/02 |
| | | | | 125/13.01 |
| 2011/0079207 | A1 | 4/2011 | Guth | |
| 2012/0080206 | A1 | 4/2012 | Walker | |
| 2014/0223748 | A1 | 8/2014 | Guth | |

FOREIGN PATENT DOCUMENTS

| | | |
|---|---|---|
| CN | 204800688 U | 11/2015 |
| DE | 19812040 A1 | 10/1998 |
| DE | 19838480 A1 | 3/1999 |
| EP | 2 965 886 A2 | 1/2016 |
| GB | 2 373 746 A | 10/2002 |
| GB | 2373746 A | 10/2002 |
| JP | H06-79520 A | 3/1994 |
| JP | H11-138334 A | 5/1999 |
| WO | 98/43794 A1 | 10/1998 |
| WO | 2006/088426 A1 | 8/2006 |
| WO | 2014/127037 A2 | 8/2014 |
| WO | 2015/028906 A1 | 7/2015 |

OTHER PUBLICATIONS

International Search Report and Written Opinion for International Application No. PCT/SE2017/051075 dated Feb. 22, 2018.

* cited by examiner

DUST REMOVAL ARRANGEMENT FOR AN ENGINE-DRIVEN TOOL

TECHNICAL FIELD

The present disclosure relates to an engine-driven tool that comprises a rotatable work tool and an engine that is arranged to propel a first driving pulley via a clutch wheel comprised in a power transferring unit. The engine-driven tool further comprises a shielding cover that is arranged to shield a part of the rotatable work tool.

BACKGROUND

Many motor tools such as engine-driven handheld cutting machines have saw blades which may be circular or ring-shaped. Such a cutting machine may be used for cutting hard materials such as concrete or rock, where the cutting procedure may result in the creation of dust. For example concrete dust is unhealthy to breathe and also impairs visions, and it is desired to minimize the creations of such dust that freely may expand in the air. Such free concrete dust that finds its way into the engine of the tool drastically affects the engine in a negative way, may cause undesirable health effects and generally pollutes the environment.

Many tools of the above type or for this purpose equipped with a water supply, where a flow of water is directed towards the saw blade in such a way that a large quantity of the dust is mixed with the water and thus retained and kept from expanding in the air.

The flow of water is preferably held at a minimum while maintaining a proper function, since the water normally has to be taken care of at the working site, more water than necessary is undesirable. At some working sites, a demand for cleanliness, or shortage of water, results in that such a water supply is undesired. For this purpose, many types of dust removal systems of vacuum cleaner type have been developed. Some of them have an integrated fan for propelling air into a dust hose that guides undesired dust particles to a remote dust container. These fans are normally propelled by means of a transmission arrangement that is connected to the cutting machine's main engine, and comprises one or more drive belts or geared transmissions, for example as described in U.S. Pat. No. 6,039,037. It is desired to obtain a less complicated and versatile dust removal arrangement for an engine-driven tool such as a power cutter.

The dust that is to be removed is first often collected in a shielding cover that is arranged to shield a part of the saw blade, where the shielding cover comprises an outlet that is connected to the fan for removing the dust that has been collected in the shielding cover. It is therefore desired that as much dust as possible is collected in the shielding cover when operating an engine-driven tool such as a power cutter, avoiding dust to be released in surrounding air. WO 2014127037 discloses a dust shroud that is configured with either one or two extending and telescoping lower rigid jaws, but a more efficient arrangement is desired.

SUMMARY

The object of the present disclosure is to provide a dust removal arrangement for an engine-driven tool that is less complicated and versatile compared to prior art, where a reliable removal of dust is provided, minimizing dust that is released in surrounding air.

This object is achieved by means of an engine-driven tool comprising a rotatable work tool having a center and a circumference and an engine that is arranged to propel the rotatable work tool. The engine-driven tool further comprises a shielding cover that is arranged to shield a part of the rotatable work tool and a first swiveling part that is attached by means of a first swivel attachment and partly extends either inside or outside the shielding cover, allowing the first swiveling part to pivot around a first swivel axis that crosses the rotatable work tool closer to the center of the rotatable work tool than the circumference of the work tool. The engine-driven tool comprises a second swiveling part that is attached to the first swiveling part and partly extends either inside or outside the first swiveling part. The second swiveling part is attached to the first swiveling part by means of a second swivel attachment allowing the second swiveling part to pivot around a second swivel axis that runs outside the circumference of the rotatable work tool, allowing the swiveling parts to self-adjust to a work surface such that the amount of dust that enters the shielding cover is increased.

According to an example, the second swiveling part comprises a slot that admits clearance for the saw rotatable work tool.

According to another example, the shielding cover comprises a dust channel that is formed between the shielding cover and the rotatable work tool. A dust hose is arranged to at least indirectly connect the dust channel to a dust container. A fan arrangement is arranged to convey air from the dust channel into the dust container via the dust hose.

According to another example, the second swivel attachment have attached supporting wheels that enable the engine-driven tool to run on these supporting wheels when in operation.

According to another example, the engine-driven tool comprises a first spring means that is arranged to expose the first swiveling part to a first spring force and a second spring means that is arranged to expose the second swiveling part to a second spring force. Each spring force is arranged to extend the corresponding swiveling part away from the shielding cover.

According to another example, the first swiveling part is attached to a saw blade bearing frame by means of the first swivel attachment.

This object is also achieved by an engine-driven tool comprising a rotatable work tool and an engine that is arranged to propel a first driving pulley comprised in a power transferring unit that comprises an endless drive belt that is arranged to at least indirectly propel the rotatable work tool when the first driving pulley is propelled. The engine-driven tool further comprises a shielding cover that is arranged to shield a part of the rotatable work tool, and a dust channel that is formed between the shielding cover and the rotatable work tool. The dust channel is at least indirectly connected to a fan arrangement that is arranged to convey air from the dust channel and comprises a fan turbine that is connected to a fan pulley comprised in the power transferring unit. The drive belt is arranged to propel the fan pulley. When the fan pulley is in a tensioned state, the drive belt is tensioned and arranged to drive both the fan pulley and the rotatable work tool, and when the fan pulley is in a released state, the tension of the drive belt is released.

According to an example, the engine-driven tool comprises a dust hose that is arranged to connect the dust channel to a dust container, where the fan arrangement is arranged to convey air from the dust channel into the dust container via the dust hose.

This object is also achieved by an engine-driven tool comprising a rotatable work tool and an engine that is arranged to propel a first driving pulley via a clutch wheel comprised in a power transferring unit. The first driving pulley and the clutch wheel are arranged to rotate around a common driving axis, and the clutch wheel has an outer edge that is farthest from the driving pulley along the common driving axis. The power transferring unit comprises an endless drive belt that is arranged to at least indirectly propel the rotatable work tool when the first driving pulley is propelled. The engine-driven tool further comprises a shielding cover that is arranged to shield a part of the rotatable work tool, and a dust channel that is formed between the shielding cover and the rotatable work tool. The dust channel is at least indirectly connected to a fan arrangement that is arranged to convey air from the dust channel and comprises a fan turbine that is connected to a fan pulley comprised in the power transferring unit. The drive belt is arranged to propel the fan pulley. A first overlap line extends along the outer edge of the clutch wheel, perpendicular to the extension of the common driving axis, the first overlap line further extending via the fan turbine.

Other examples are disclosed in the dependent claims.

A number of advantages are obtained by means of the present disclosure. Mainly, a transmission arrangement for propelling a dust removal fan is provided having an integrated tensioning functionality. Furthermore, a more reliable collecting of dust is provided, minimizing dust that is released in surrounding air.

BRIEF DESCRIPTION OF THE DRAWINGS

The present disclosure will now be described more in detail with reference to the appended drawings, where.

DETAILED DESCRIPTION

Figure 1:
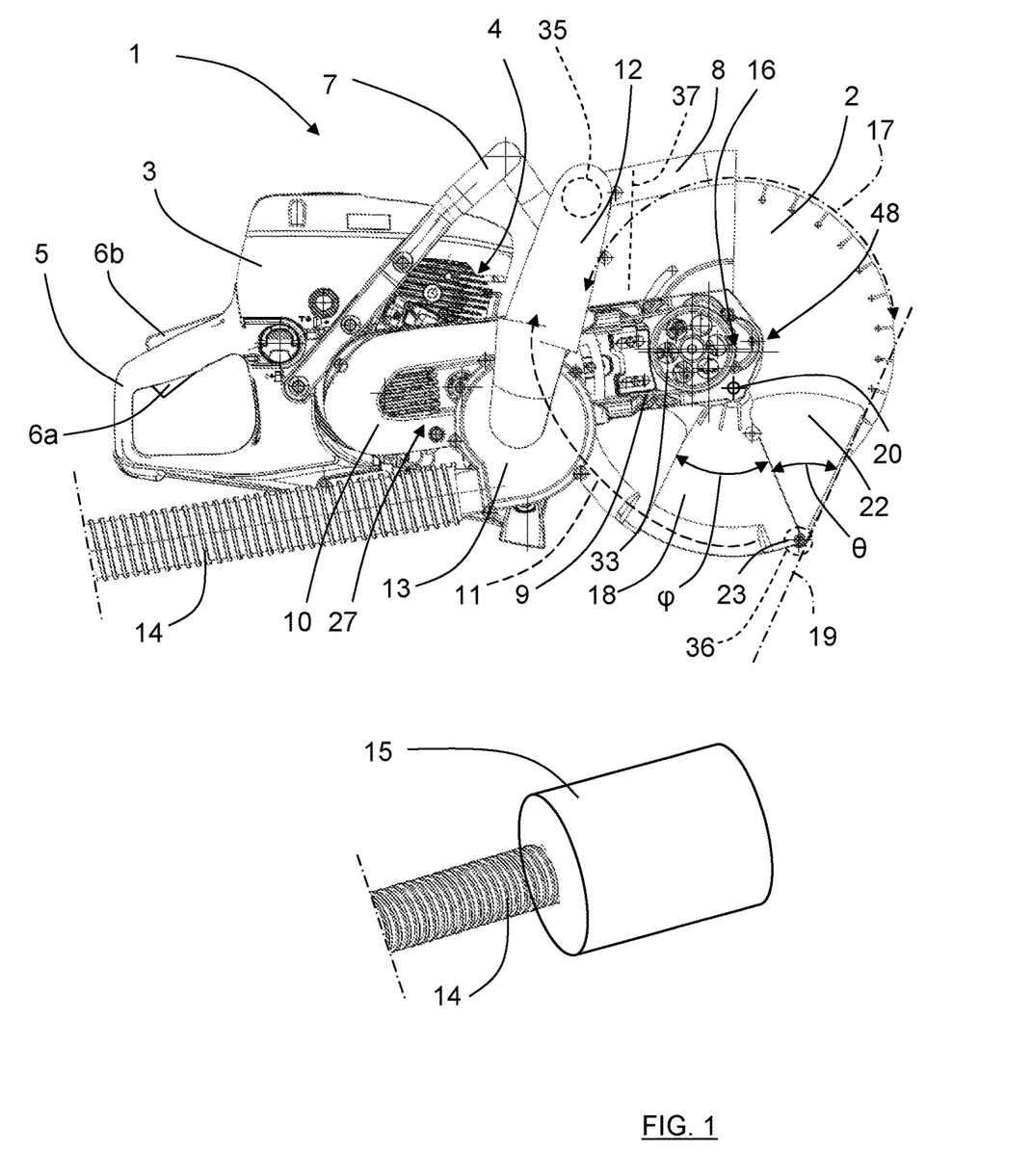
FIG. 1 shows a side view of a hand-held power cutter with swiveling parts in a first position.
Figure 2:
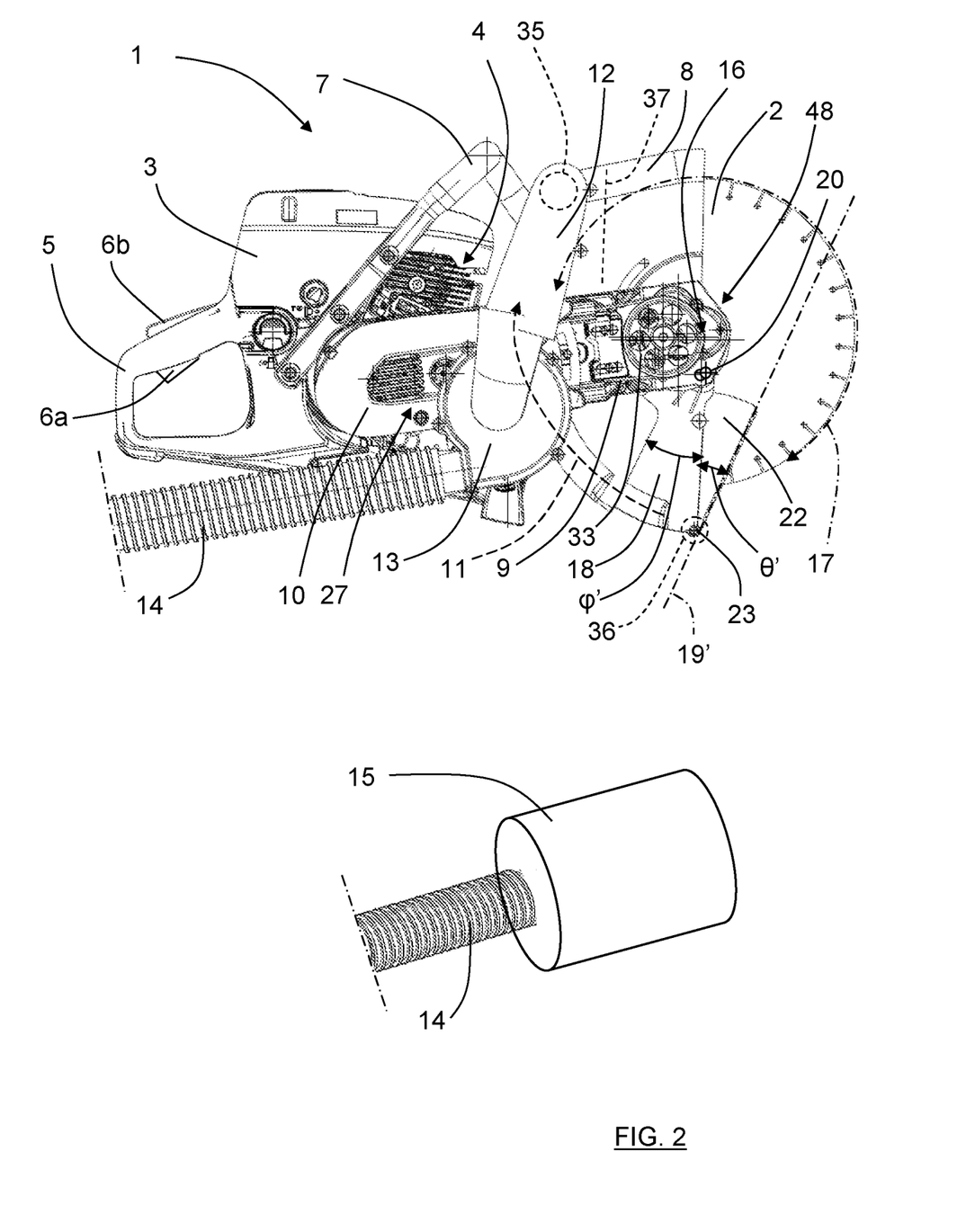
FIG. 2 shows a side view of a hand-held power cutter with swiveling parts in a second position.

FIG. 1 and FIG. 2 shows respective side views of a hand-held power cutter 1 with a circularly shaped saw blade 2, for example suitable to cut through concrete. The saw blade 2 has a center 16 and a circumference 17 (only schematically indicated). The power cutter 1 comprises a casing 3 at least partly enclosing a combustion engine 4, where the casing 3 in turn comprises a first handle part 5 from which a power/throttle switch 6a and corresponding switch lock 6b is accessible. The power cutter 1 further comprises a second handle part 7 that runs in an arcuate shape over the casing 3, the second handle part 7 being attached to the casing 3 via means that attenuate vibrations in a well-known manner.

The power cutter 1 comprises a shielding cover 8 that is arranged to shield a part of the saw blade 2. The saw blade 2 is connected to the engine 4 via a power transferring unit 27 that comprises a power transferring means 9 that is covered by a power transfer cover 10. The power transferring means 9 is according to some aspects either in the form of an endless drive belt or a geared transmission. Here, a drive belt 9 is shown, driving a second drive pulley 33 that in turn is arranged to propel the saw blade 2. The power transferring unit 27 can also be referred to as a clutch side crank case.

A dust channel 11 is formed between the shielding cover 8 and the saw blade 2, where a dust pipe 12 is connected between an upper part of the shielding cover 8 and a fan arrangement 13 that is adapted to lower the air pressure at the dust pipe 12 such that air is conveyed from the dust pipe 12 and further into a hose 14 that is connected between the fan arrangement 13 and a dust container 15. The dust container 15 is arranged to receive the dust that has been propelled from the dust channel 11 by means of the fan arrangement 13 such that an operation that is similar or the same as the operation of a vacuum cleaner is obtained. It is to be noted that the dust container 15 only is schematically indicated for describing a principle, not being shown in actual size and configuration.

Figure 3:
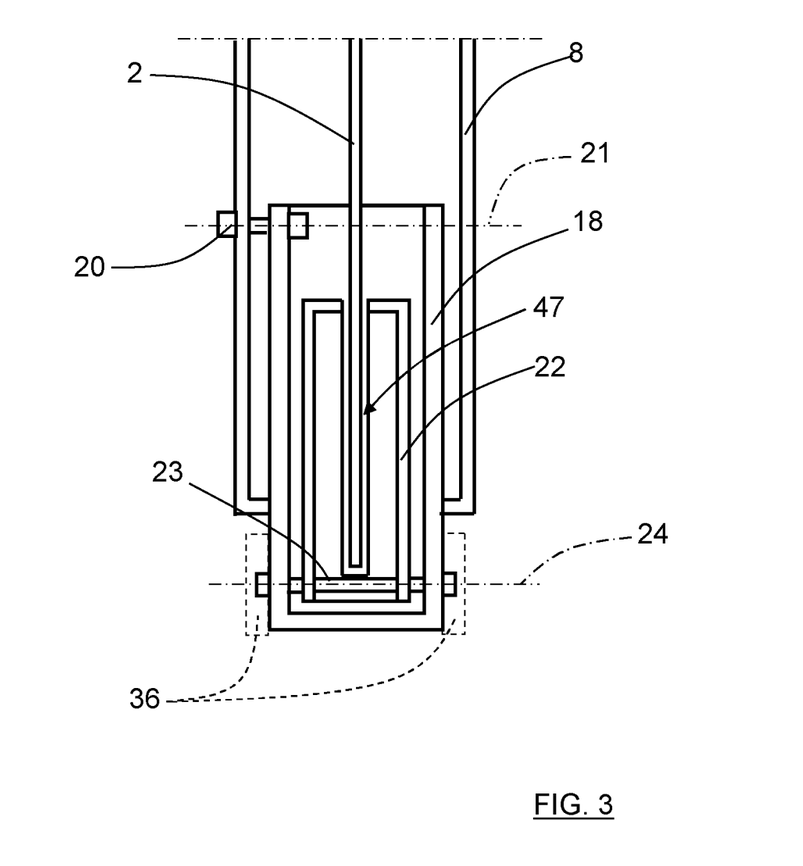
FIG. 3 shows a schematic front view of a part of the saw blade in the shielding cover.

When the power cutter 1 is in operation and the saw blade 2 for example is cutting through concrete, a lot of concrete dust is formed. By means of the fan arrangement 13 and the dust hose 14, the concrete dust is conveyed from the dust channel 11 in the shielding cover 8 to the dust container 15. In order to obtain a proper functionality, it is desired that the amount of dust that escapes the dust channel 11 in the shielding cover 8 is minimized, and therefore a first swiveling part 18 is attached to the shielding cover 8 such that a self-adjusting cover between the power cutter 1 and a work surface 19, here schematically indicated with a dash-dotted line, is obtained. With reference also to FIG. 3, showing a schematic front view of a part of the saw blade in the shielding cover, the first swiveling part 18 is attached to the shielding cover 8 by means of a first swivel attachment 20 allowing the first swiveling part 18 to pivot around a first swivel axis 21 that crosses the saw blade 2 closer to the center 16 of the saw blade 2 than the circumference 17 of the saw blade 2. The first swiveling part 18 can be attached to any suitable part such as a saw blade bearing frame 49 as shown in FIG. 1 and FIG. 2. Such a saw blade bearing frame 49 can be a separate part, or integrated with the shielding cover 8. In FIG. 3, the first swiveling part 18 is shown to be attached to the shielding cover 8.

According to the present disclosure, a second swiveling part 22 is attached to the first swiveling part 18 such that an improved self-adjusting combined cover between the power cutter 1 and the work surface 19 is obtained. The second swiveling part 22 is attached to the first swiveling part 18 by means of a second swivel attachment 23 allowing the second swiveling part 22 to pivot around a second swivel axis 24 that runs outside the circumference 17 of the saw blade 2.

The second swiveling part 22 comprises a slot 47 that admits clearance for the saw blade 2.

Both swiveling parts 18, 22 have a pie-shaped appearance, where the first swiveling part 18 partly extends inside the shielding cover 8, and where the second swiveling part 22 extends inside the first swiveling part 18, such that each swiveling part 18, 22 has a certain degree of exposure that changes as each swiveling part 18, 22 pivot around its corresponding swivel axis 21, 24. As a result of this the first swiveling part 18 has first clearance angle φ and the second swiveling part 22 has second clearance angle θ.

Both swiveling parts 18, 22 self-adjust to the work surface 19 such that the amount of dust that escapes the dust channel 11 in the shielding cover 8 is minimized, resulting in a minimized amount of dust that is released into surrounding air. In FIG. 1, the swiveling parts 18, 22 have a certain position due to the position of the work surface 19, and in FIG. 2 the swiveling parts 18, 22 have another position where the clearance angles φ', θ' have decreased due to a changed position of the work surface 19'.

Figure 4:
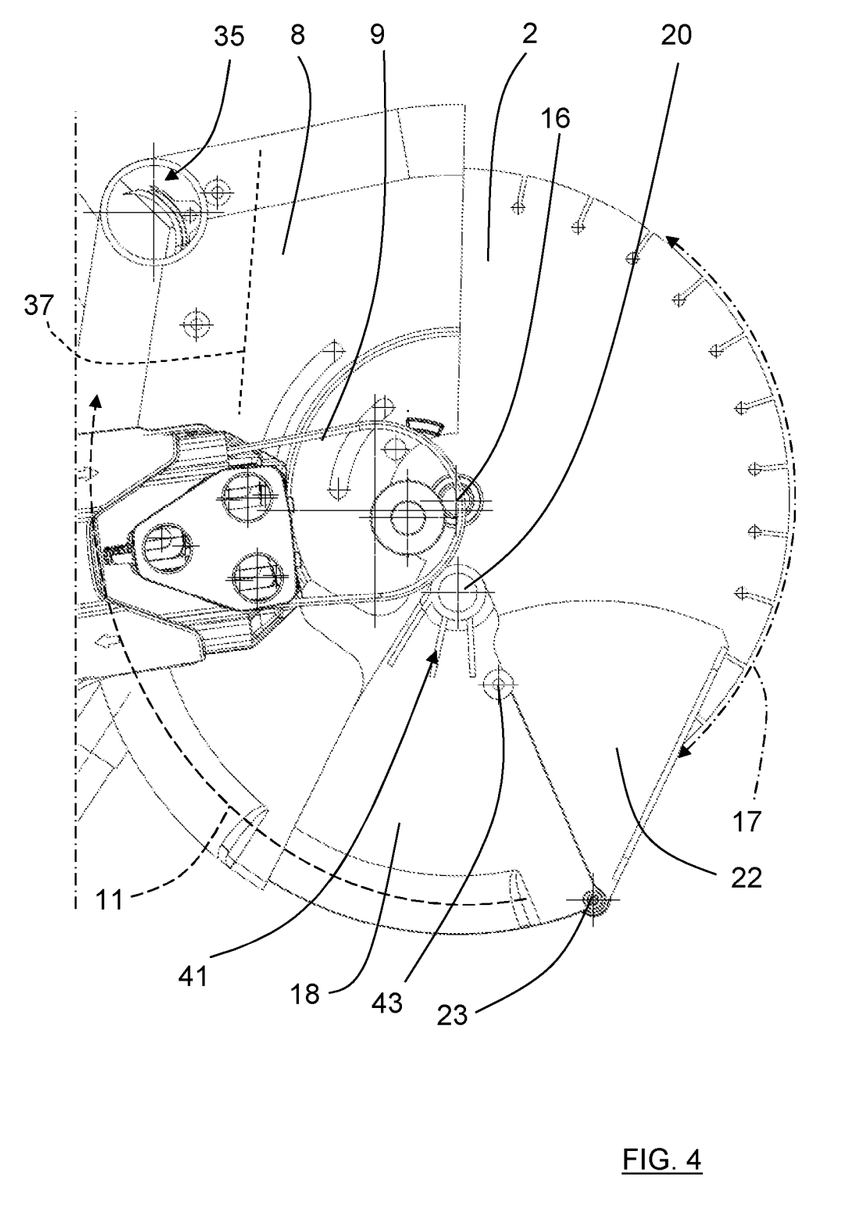
FIG. 4 shows a side view of the saw blade in the shielding cover.
Figure 5:
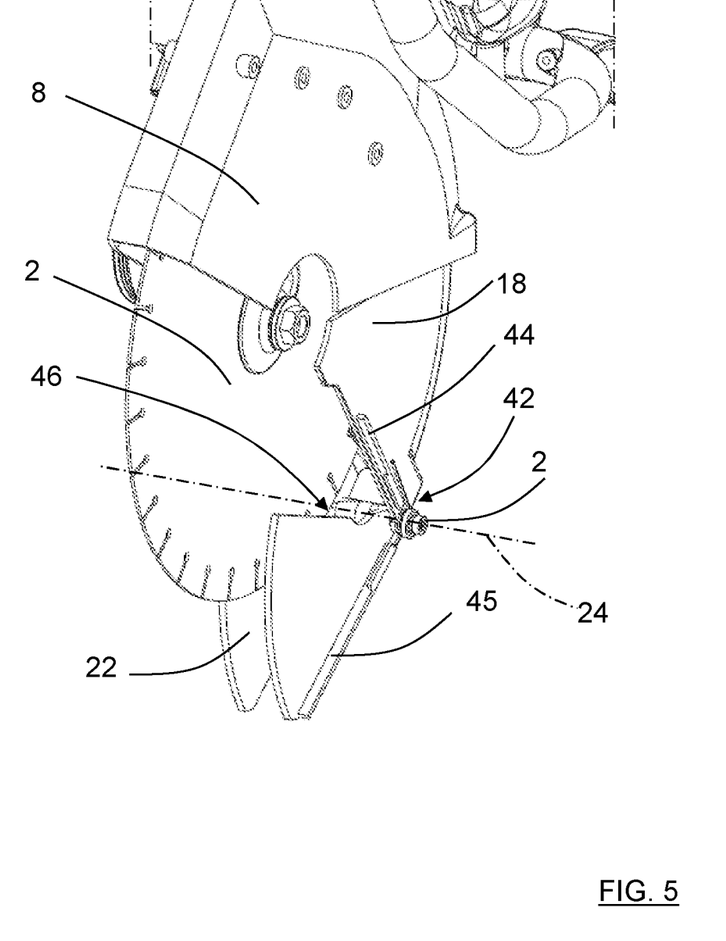
FIG. 5 shows a perspective top view of the saw blade in the shielding cover.

With reference to FIG. 4, showing a detail side view of the saw blade 2 in the shielding cover 8 without the second drive wheel, the saw blade bearing frame 49 and the dust pipe, and FIG. 5, showing a detail perspective view of the saw blade 2 in the shielding cover 8 without the first swivel attachment 20 and the saw blade bearing frame 49, there is a first spring means 41 that is arranged to expose the first swiveling part 18 to a first spring force and a second spring means 42 that is arranged to expose the second swiveling part 22 to a second spring force. The swiveling parts 18, 22 are thus spring-loaded, such that the corresponding spring force is arranged to maximize the corresponding clearance angle φ, θ.

The second swiveling part 22 is retained by means of the stop pin 43. The second spring means 42 is retained by a first rim 44, formed on the first swiveling part 18 and a second rim 45 formed on the second swiveling part 22. These rims 44, 45 also provide enforcements for the swiveling parts 18, 22, conferring an enhanced rigidity. The second swiveling part 22 comprises a shaped edge 46 that is arranged to pivot into the shielding cover 8, where its shape is optimized for enabling maximal possible pivoting into the shielding cover 8.

According to some aspects, the first swiveling part 18 partly extends outside the shielding cover 8, and according to some aspects, the second swiveling part 22 partly extends outside the first swiveling part 18. In general terms this means that the second swiveling part 22 is arranged to extend along the circumference 17 of the saw blade 2 to a larger extent than the first swiveling part 18, while the first swiveling part 18 is arranged to extend radially from the center 16 of the saw blade 2 than the second swiveling part 22.

If the first swiveling part 18 partly extends outside the shielding cover 8, and the second swiveling part 22 partly extends inside the first swiveling part 18, the first swiveling part 18 will not be concealed and then has a constant clearance angle. If the second swiveling part 22 partly extends outside the first swiveling part 18, the second swiveling part 22 will not be concealed and then has a constant clearance angle.

According to some aspects, as shown in FIG. 1, FIG. 2 and FIG. 4, the dust channel 11 is connected to the dust pipe 12 via an aperture 35, where the aperture 35 is positioned outside the circumference 17 of the saw blade 2. In view of the distance that the dust which forms during sawing operation is propelled via the swiveling parts 18, 22, and the normal rotational speed of the saw blade during operation, the aperture 35 has an advantageous position in order to enable as much dust as possible to be removed from the dust channel 11 via the dust pipe 12. Furthermore, in order to even more increase the amount of dust that is removed from the dust channel 11 via the dust pipe 12, a separating wall 37 is formed in shielding cover 8 with a slot aperture for the saw blade 2. The separating wall 37 prevents dust that has not immediately been conveyed into the dust pipe 12 from following the motion of the saw blade 12, escaping the shielding cover 8 and getting into the environment.

Figure 6:
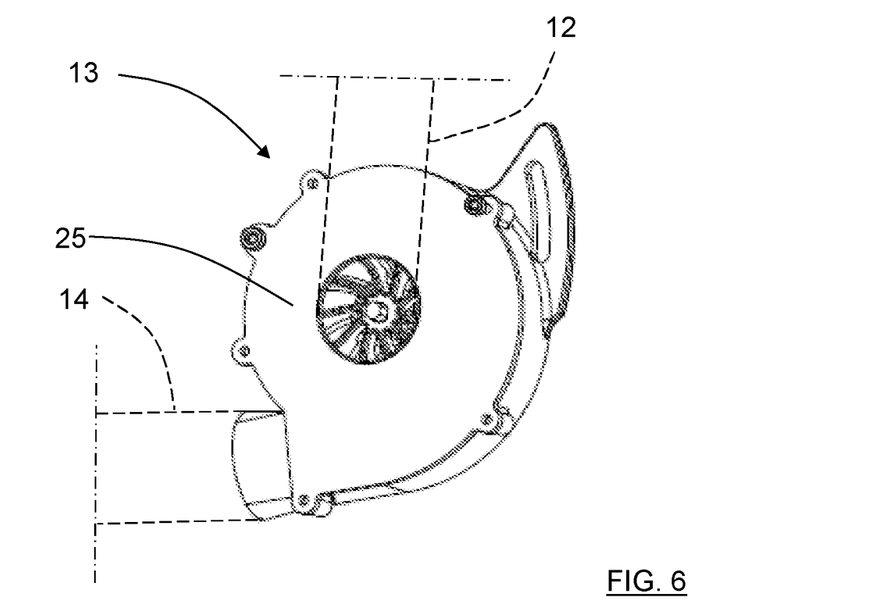
FIG. 6 shows a perspective front view of a fan arrangement with a cover.
Figure 7:
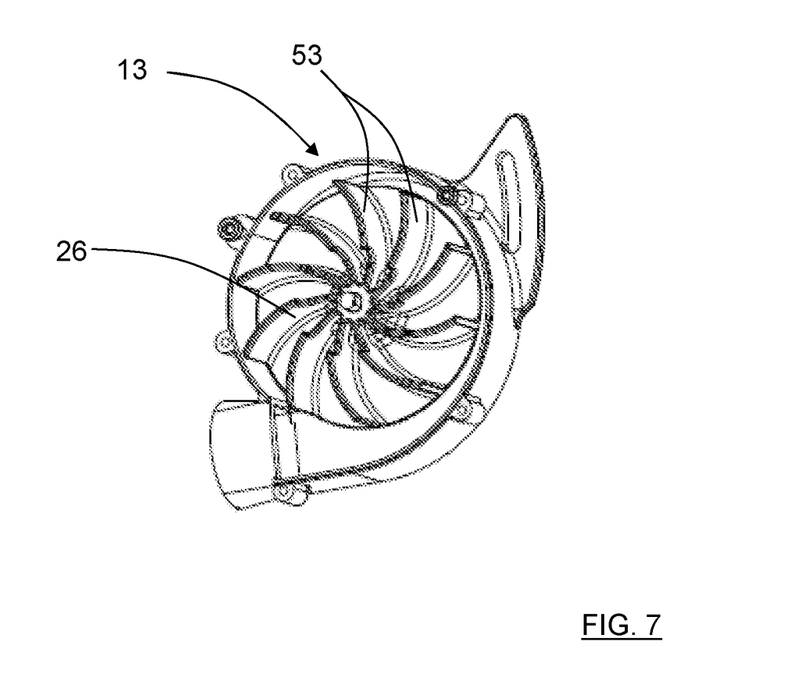
FIG. 7 shows a perspective front view of a fan arrangement without a cover.

FIG. 6 shows the fan arrangement 13 with a cover 25, and FIG. 7 shows the fan arrangement 13 without the cover 25, where a fan turbine 26 is placed and arranged to be propelled for conveying dust from the dust pipe 12 and further into the hose 14 as shown in FIG. 1 and FIG. 2. For this purpose, the fan turbine 26 comprises a plurality of fan blades 53 as shown in FIG. 7. The cover 25 has an outer surface 55 that is farthest from the fan turbine 26.

Figure 8:
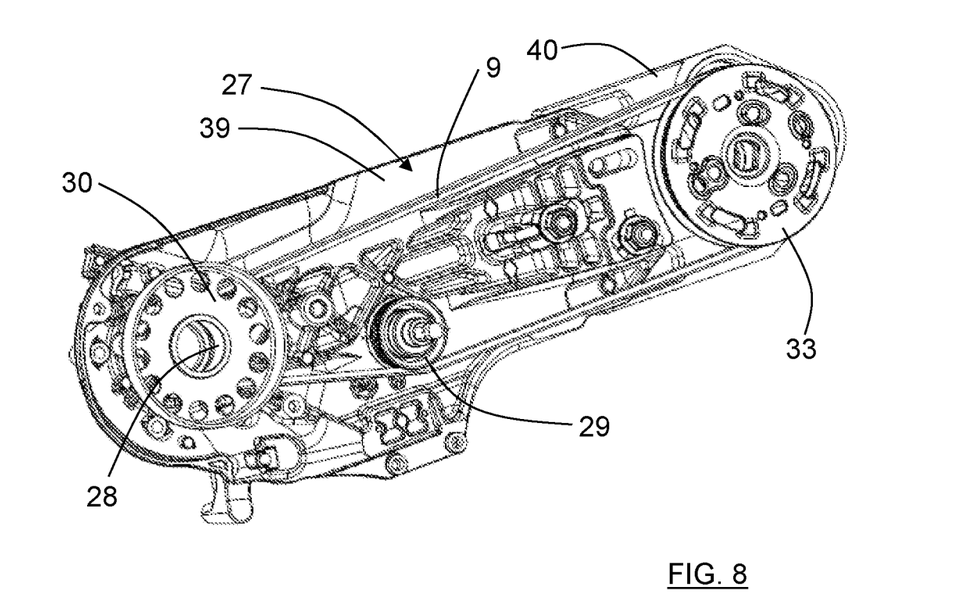
FIG. 8 shows a perspective front view of a first example of a power transferring unit with a belt in a tensioned state.
Figure 9:
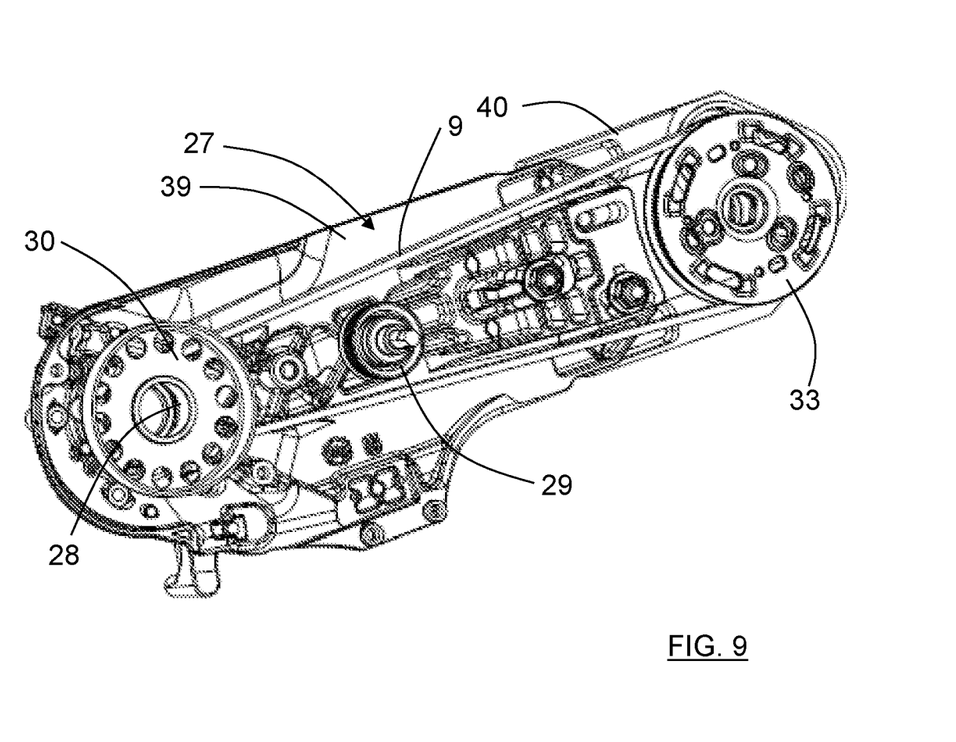
FIG. 9 shows a perspective front view of the first example of a power transferring unit with a drive belt in a released state.

FIG. 8 and FIG. 9 show respective perspective front views of the power transferring unit 27 of the power cutter where the power transfer cover 10 and the fan arrangement 13 are removed. A first driving pulley 28 is connected to an endless drive belt 9 that here constitutes the power transferring means, where the drive belt is tensioned against a fan pulley 29 that is arranged to be connected to the fan turbine 26 when the fan arrangement 13 is mounted. The fan pulley 29 is furthermore arranged to propel the fan turbine 26 when the drive belt 9 rotates the fan pulley 29. The drive belt 9 is arranged to propel the second driving pulley 33 which is arranged to propel the saw blade 2 in a well-known manner; for example directly or via a transmission.

The first driving pulley 28 is connected to the engine via a clutch wheel 30 and an engine gear arrangement (not shown). For reasons of clarity, well-known clutch parts that normally are positioned within the clutch wheel 30 and are arranged to confer transmission between the clutch wheel 30 and the first driving pulley 28 at certain rotational velocities are not shown. These clutch parts normally work by centrifugal forces and are commonly used in tools of this kind. The clutch wheel 30 and the first driving pulley 28 are arranged to rotate around a common driving axis 38, where the clutch wheel 30 has an outer edge 52 that is farthest from the driving pulley 28 along the common driving axis 38.

According to some aspects, the rotational speed of the engine is geared to a lower rotational speed at the first driving pulley 28 by means of the engine gear arrangement, and then the rotational speed of the a second driving pulley 33 is geared to a lower rotational speed at the saw blade 2.

This means that during operation of the power cutter 1, the engine 4 is arranged to propel the first driving pulley 28 via the clutch wheel 30, where the first driving pulley 28 in turn drives the drive belt 9. When the drive belt is moving, it also rotates the fan pulley 29, bringing the fan turbine 26 into motion and thus the fan arrangement 13 into operation. By choosing a suitable diameter of the fan pulley 29, a desired rotational speed of the fan pulley 29, and thus of the fan turbine 26, during normal operation of the power cutter 1 is obtained.

Figure 10:
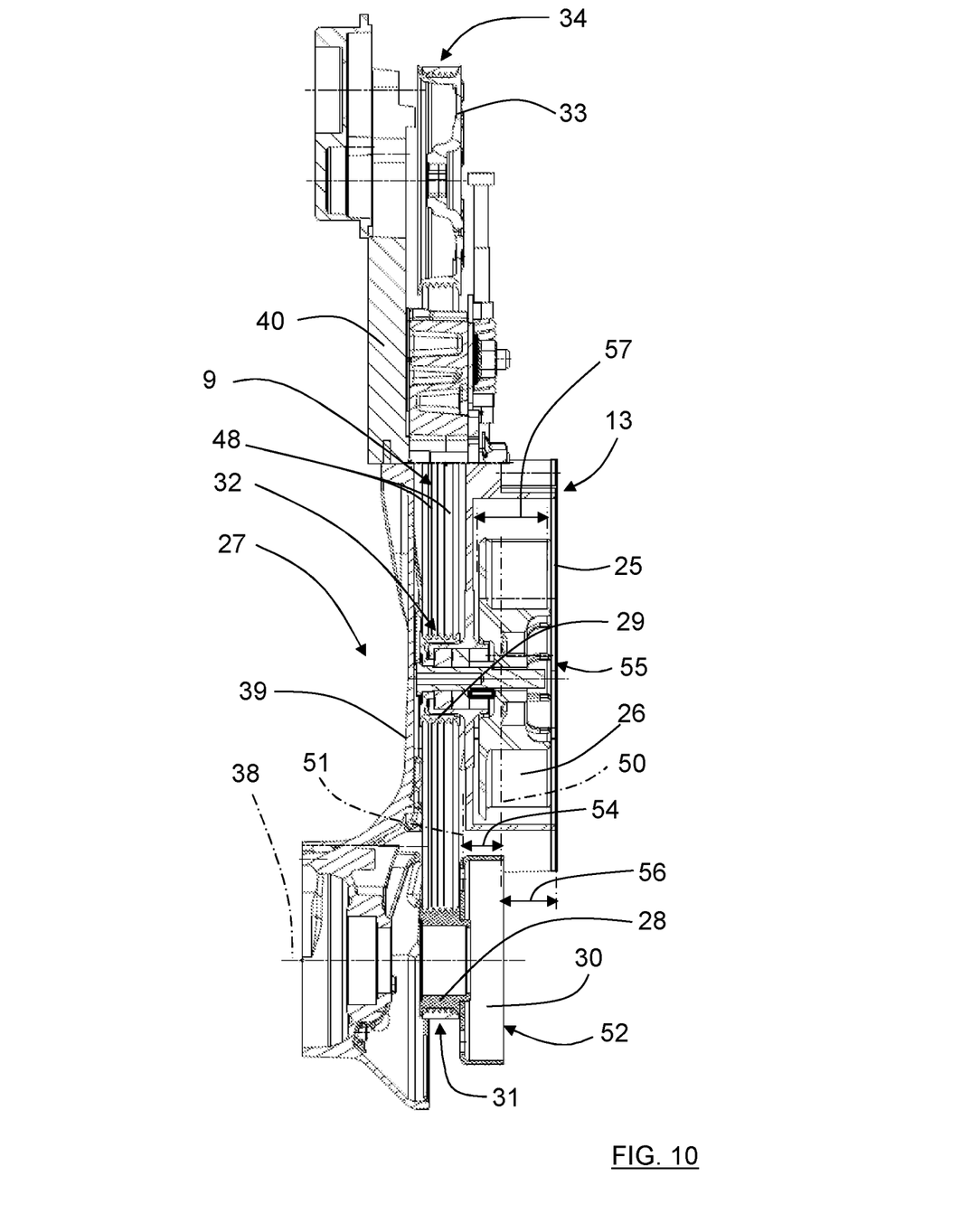
FIG. 10 shows an upper sectional view of FIG. 8.

With reference also to FIG. 10, showing an upper sectional view of FIG. 8 with the fan arrangement 13 mounted, in order to obtain a reliable power transmission between the belt and the pulleys 28, 29, 33, each pulley 28, 29, 33 comprises teeth 31, 32, 34 that engage corresponding belt teeth 48 (a few indicated for reason of clarity).

According to another aspect of the present disclosure with continued reference to FIG. 10, when mounted, the fan arrangement 13 is arranged to at least partly overlap the clutch wheel 30 along a direction parallel to the extension of the common driving axis 38. This compact mounting arrangement provides a stable handling of the power cutter 1 with a side-mounted fan arrangement 13.

More in detail, in FIG. 10, there is a first overlap line 50 and a second overlap line 51, where the overlap lines 50, 51 are mutually parallel and extend perpendicular to the extension of the common driving axis 38. The first overlap line 50 extends along the outer edge 52 of the clutch wheel 30, and the second overlap line 51 extends between the fan turbine 26 and the drive belt 9. The first overlap line 50 extends via the fan turbine 26, running through a plurality of fan blades 53.

There is an overlap distance 54 between the first overlap line 50 and the second overlap line 51, where the overlap distance 54 exceeds zero. There is also a protrusion distance 56 between the outer surface 55 of the cover 25 and the first overlap line 50. According to some aspects, the protrusion distance 56 is minimized.

The fan turbine has a turbine height 57; in FIG. 10 the turbine height 57 extends parallel to the extension of the common driving axis 38. According to some aspects, the protrusion distance 56 falls below the turbine height 57.

Furthermore, according to yet another aspect of the present disclosure, the fan pulley 29 is adjustable and arranged for tensioning the drive belt 9. In FIG. 8, the fan pulley 29 is adjusted such that the drive belt 9 is tensioned and ready for operation, and in FIG. 9, the fan pulley 29 is adjusted such that the drive belt 9 is released from tension, a suitable position if, for example, the drive belt should be replaced. Here, the drive belt 9 is running on an outside of the fan pulley 29, such that when the fan pulley 29 is moved away from a part of the drive belt 9 that is extending between the first driving pulley 28 and the saw blade, and is not intended to be in contact with the fan pulley 29, the drive belt 9 is tensioned.

Figure 11:
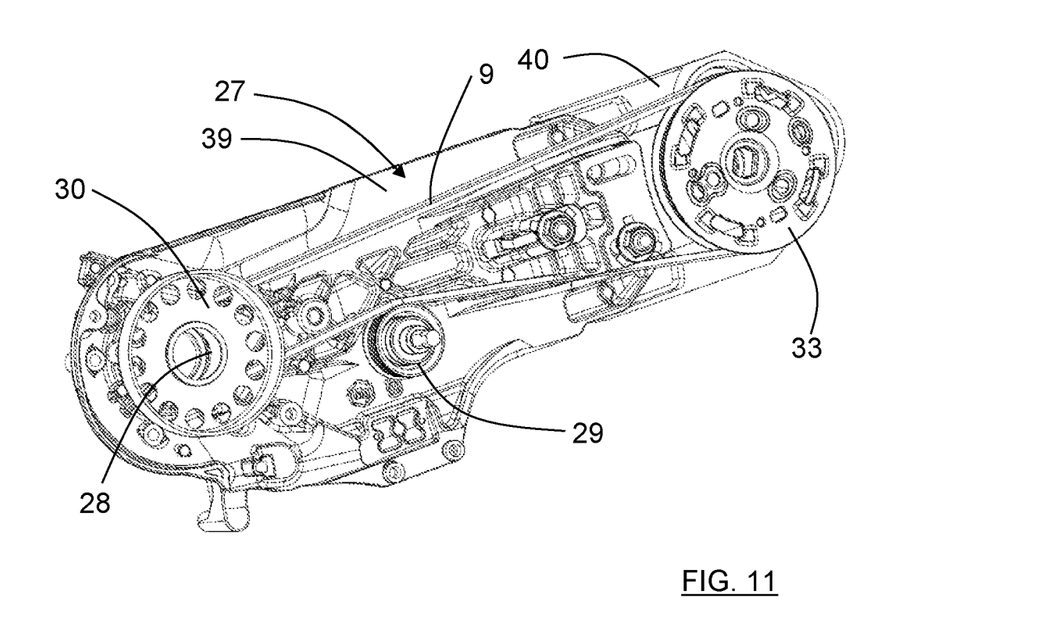
FIG. 11 shows a perspective front view of a second example of a power transferring unit with a belt in a tensioned state.
Figure 12:
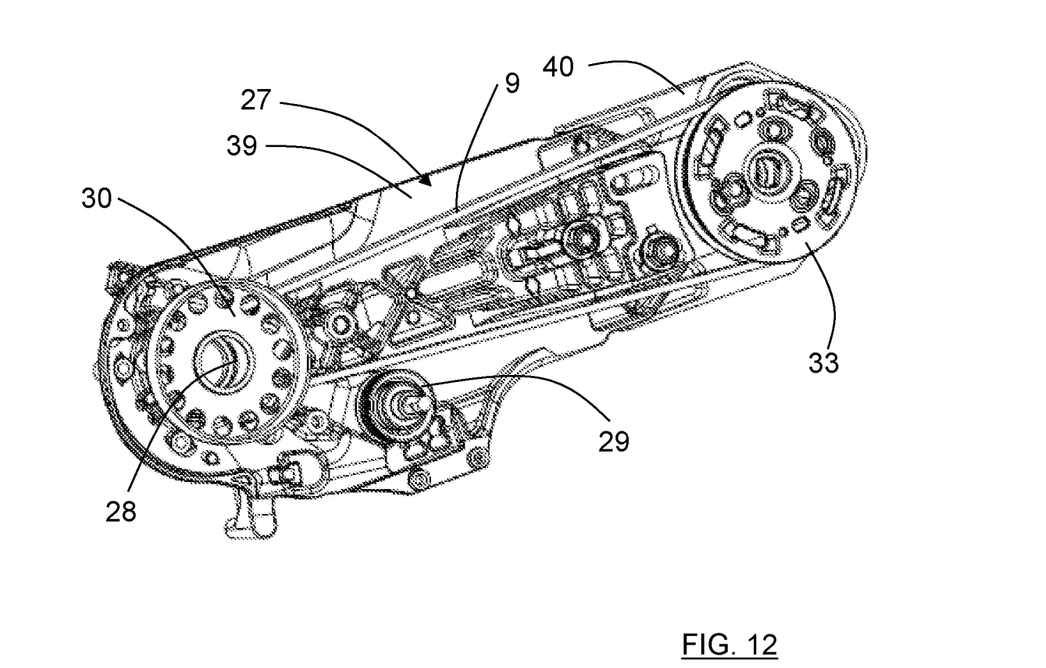
FIG. 12 shows a perspective front view of the second example of a power transferring unit with a drive belt in a released state.

The drive belt 9 could run at any side of the fan pulley 29, as shown in FIG. 11 and FIG. 12. In FIG. 11, the fan pulley 29 is adjusted such that the drive belt 9 is tensioned and ready for operation, and in FIG. 12, the fan pulley 29 is adjusted such that the drive belt 9 is released from tension. Here, the drive belt 9 is running on an inside of the fan pulley 29, such that when the fan pulley 29 is moved away from a part of the drive belt 9 that is extending between the first driving pulley 28 and the saw blade, and is not intended to be in contact with the fan pulley 29, the drive belt 9 is released from tension.

The present disclosure is not limited to the above examples, but may vary freely within the scope of the appended claims. For example, the hand-held power cutter 1 with a ring-shaped saw blade 2 may be any type of engine-driven tool with a rotatable work tool such as a saw blade, a circular saw blade or a ring saw blade, where dust removal is desired. Only some items of the engine-driven tool in the example have been described, the engine-driven tool in itself being of a well-known kind. The engine can either be a combustion engine or an electric motor.

With reference to FIG. 8, FIG. 9, FIG. 10, FIG. 11 and FIG. 12, the belt 9 can be tensioned by having an adjustable power transferring unit 27, where a first frame part 39 and a second frame part 40 are slidably movable in relation to each other in a previously well-known manner. This tensioning arrangement can be the only available, the fan pulley 29 being fixed. Alternatively, The adjustable fan pulley 29 as described above can also be the only tensioning arrangement available. A combination of both is also conceivable. The tensioning procedure may in all cases be performed in any conventional manner. For example by means of a tensioning screw assembly that is arranged to separate adequate parts when tensioning, or by means of a swiveling cam that is arranged to separate adequate parts when tensioning. These and other such arrangements are well-known in the art.

According to some aspects, the fan arrangement 13 is connected directly to the dust channel 11; alternatively, the dust pipe 12 is comprised in the fan arrangement 13.

According to some aspects, the fan arrangement 13 comprises a dust container.

According to some aspects, the fan arrangement 13 is arranged to blow the collected dust into the environment away from a person operating the power cutter, possibly via a dust hose part.

When a drive belt 9 is used, according to some aspects the drive belt is arranged to propel the saw blade via a gear transmission.

For the embodiments with reference to FIGS. 1-3, a fan arrangement 13 is shown positioned on the power cutter, and can then be powered as described in the embodiments with reference to FIGS. 4-8. Generally, for the embodiments with reference to FIGS. 1-3, there need not be any fan arrangement at all, the swiveling parts 18, 22 merely being arranged to keep dust within the shielding cover 8, or to just have it disposed in any convenient direction by a pipe, tube, opening and/or hose, suitably away from a person operating the power cutter.

For the embodiments with reference to FIGS. 6-12, the swiveling parts 18, 21 may of course also be applied.

The shielding cover 8 has two sides, one at each side of the saw blade 2. In FIG. 3, the first swivel attachment 20 is shown as a pin attached to one side of the shielding cover 8. Of course, there could be two such pins, one at each side. The second swivel attachment 23 is here shown as a shaft running between both sides of the shielding cover. Here, one or two pins as described for the first swivel attachment 20 could be used instead.

As shown with dashed lines in FIG. 1, FIG. 2 and FIG. 3, supporting wheels 36 may be attached to the second swivel attachment 23, allowing the power cutter to run on these supporting wheels 36 when in operation.

The drive belt 9 does not have to be arranged to propel the saw blade 2 via a gear arrangement, but may be arranged to propel the second drive pulley 33 which in turn is directly connected to the saw blade 2 without any gears.

If a fan arrangement is used for disposing of the dust for the embodiments with reference to FIGS. 1-3, it may be positioned anywhere, for example it can be comprised in the dust container 15 at the end of the dust hose 14. The fan can be electrically powered, according to some aspects by an electrical current that is generated in the power cutter.

Generally, the present disclosure relates to an engine-driven tool 1 comprising a rotatable work tool 2 having a center 16 and a circumference 17, an engine 4 that is arranged to propel the rotatable work tool 2, where the engine-driven tool 1 further comprises a shielding cover 8 that is arranged to shield a part of the rotatable work tool 2 and a first swiveling part 18 that is attached by means of a first swivel attachment 20 and partly extends either inside or outside the shielding cover 8, allowing the first swiveling part 18 to pivot around a first swivel axis 21 that crosses the rotatable work tool 2 closer to the center 16 of the rotatable work tool 2 than the circumference 17 of the rotatable work tool 2. The engine-driven tool 1 comprises a second swiveling part 22 that is attached to the first swiveling part 18 and partly extends either inside or outside the first swiveling part 18, where the second swiveling part 22 is attached to the first swiveling part 18 by means of a second swivel attachment 23, allowing the second swiveling part 22 to pivot around a second swivel axis 24 that runs outside the circumference 17 of the rotatable work tool 2, enabling the swiveling parts 18, 22 to self-adjust to a work surface 19 such that the amount of dust that enters the shielding cover 8 is increased.

According to an example, the second swiveling part 22 comprises a slot 47 that admits clearance for the saw rotatable work tool 2.

According to an example, both swiveling parts 18, 22 have a respective pie-shaped appearance.

According to an example, the shielding cover 8 comprises a dust channel 11 that is formed between the shielding cover 8 and the rotatable work tool 2, where a dust hose 14 is arranged to at least indirectly connect the dust channel 11 to a dust container 15, where a fan arrangement 13 is arranged to convey air from the dust channel 11 into the dust container 15 via the dust hose 14.

According to an example, the engine 4 is arranged to propel a first driving pulley 28 comprised in a power transferring unit 27, where the power transferring unit 27 comprises an endless drive belt 9 that is arranged to at least indirectly propel the rotatable work tool 2 when the first driving pulley 28 is propelled, where the fan arrangement 13 comprises a fan turbine 26 that is connected to a fan pulley 29 comprised in the power transferring unit 27, where the drive belt 9 is arranged to propel the fan pulley 29 and the fan pulley 29 in turn is arranged to propel the fan turbine 26.

According to an example, the each pulley 28, 29 comprises teeth 31, 32 that engage corresponding belt teeth 48.

According to an example, when the fan pulley 29 is in a tensioned state, the drive belt 9 is tensioned and arranged to drive both the fan pulley 29 and the rotatable work tool 2, and when the fan pulley 29 is in a released state, the tension of the drive belt 9 is released.

According to an example, the engine 4 is arranged to propel a first driving pulley 28 via a clutch wheel 30 comprised in a power transferring unit 27, where the first driving pulley 28 and the clutch wheel 30 are arranged to rotate around a common driving axis 38, and where the clutch wheel 30 has an outer edge 52 that is farthest from the driving pulley 28 along the common driving axis 38, where furthermore a first overlap line 50 extends along the outer edge 52 of the clutch wheel 30, perpendicular to the extension of the common driving axis 38, the first overlap line 50 further extending via the fan turbine 26.

According to an example, the engine 4 is either constituted by a combustion engine or by an electric motor.

According to an example, the second swivel attachment 23 have attached supporting wheels 36 that enable the engine-driven tool 1 to run on these supporting wheels 36 when in operation.

According to an example, the engine-driven tool 1 comprises a first spring means 41 that is arranged to expose the first swiveling part 18 to a first spring force and a second spring means 42 that is arranged to expose the second swiveling part 22 to a second spring force, where each spring force is arranged to extend the corresponding swiveling part 18, 22 away from the shielding cover 8.

According to an example, the second spring means 42 is retained by a first rim 44, formed on the first swiveling part 18 and a second rim 45 formed on the second swiveling part 22, where these rims 44, 45 are arranged to also provide an enhanced rigidity for the swiveling parts 18, 22.

According to an example, the second swiveling part 22 comprises a shaped edge 46 that is arranged to pivot into the shielding cover 8, where said edge 46 has a shape that is optimized for enabling maximal possible pivoting into the shielding cover 8.

According to an example, the first swiveling part 18 is attached to a saw blade bearing frame 49 by means of the first swivel attachment 20.

Generally, the present disclosure also relates to an engine-driven tool 1 comprising a rotatable work tool 2 and an engine 4 that is arranged to propel a first driving pulley 28 comprised in a power transferring unit 27, where the power transferring unit 27 comprises an endless drive belt 9 that is arranged to at least indirectly propel the rotatable work tool 2 when the first driving pulley 28 is propelled, where the engine-driven tool 1 further comprises a shielding cover 8 that is arranged to shield a part of the rotatable work tool 2, and a dust channel 11 that is formed between the shielding cover 8 and the rotatable work tool 2, which dust channel 11 at least indirectly is connected to a fan arrangement 13, which fan arrangement 13 is arranged to convey air from the dust channel 11 and comprises a fan turbine 26 that is connected to a fan pulley 29 comprised in the power transferring unit 27, where the drive belt 9 is arranged to propel the fan pulley 29. When the fan pulley 29 is in a tensioned state, the drive belt 9 is tensioned and arranged to drive both the fan pulley 29 and the rotatable work tool 2, and when the fan pulley 29 is in a released state, the tension of the drive belt 9 is released.

According to an example, the engine-driven tool 1 comprises a dust hose 14 that is arranged to connect the dust channel 11 to a dust container 15, where the fan arrangement 13 is arranged to convey air from the dust channel 11 into the dust container 15 via the dust hose 14.

According to an example, the engine 4 is arranged to propel a first driving pulley 28 via a clutch wheel 30 comprised in a power transferring unit 27, where the first driving pulley 28 and the clutch wheel 30 are arranged to rotate around a common driving axis 38, and where the clutch wheel 30 has an outer edge 52 that is farthest from the driving pulley 28 along the common driving axis 38, where furthermore a first overlap line 50 extends along the outer edge 52 of the clutch wheel 30, perpendicular to the extension of the common driving axis 38, the first overlap line 50 further extending via the fan turbine 26.

According to an example, the each pulley 28, 29 comprises teeth 31, 32 that engage corresponding belt teeth 48.

Generally, the present disclosure also relates to an engine-driven tool 1 comprising a rotatable work tool 2 and an engine 4 that is arranged to propel a first driving pulley 28 via a clutch wheel 30 comprised in a power transferring unit 27, where the first driving pulley 28 and the clutch wheel 30 are arranged to rotate around a common driving axis 38, and where the clutch wheel 30 has an outer edge 52 that is farthest from the driving pulley 28 along the common driving axis 38, where furthermore the power transferring unit 27 comprises an endless drive belt 9 that is arranged to at least indirectly propel the rotatable work tool 2 when the first driving pulley 28 is propelled, where the engine-driven tool 1 further comprises a shielding cover 8 that is arranged to shield a part of the rotatable work tool 2, and a dust channel 11 that is formed between the shielding cover 8 and the rotatable work tool 2, which dust channel 11 at least indirectly is connected to a fan arrangement 13 that is arranged to convey air from the dust channel 11 and comprises a fan turbine 26 that is connected to a fan pulley 29 comprised in the power transferring unit 27, where the drive belt 9 is arranged to propel the fan pulley 29. A first overlap line 50 extends along the outer edge 52 of the clutch wheel 30, perpendicular to the extension of the common driving axis 38, the first overlap line 50 further extending via the fan turbine 26.

According to an example, when the fan pulley 29 is in a tensioned state, the drive belt 9 is tensioned and arranged to drive both the fan pulley 29 and the rotatable work tool 2, and when the fan pulley 29 is in a released state, the tension of the drive belt 9 is released.

According to an example, the engine-driven tool 1 comprises a dust hose 14 that is arranged to connect the dust channel 11 to a dust container 15, where the fan arrangement 13 is arranged to convey air from the dust channel 11 into the dust container 15 via the dust hose 14.

According to an example, each pulley 28, 29 comprises teeth 31, 32 that engage corresponding belt teeth 48.

According to an example, there is a second overlap line 51 that extends between the fan turbine 26 and the drive belt 9, perpendicular to the extension of the common driving axis 38, where an overlap distance 54 is formed between the first overlap line 50 and the second overlap line 51, where the overlap distance 54 exceeds zero.

The invention claimed is:

1. An engine-driven tool comprising:
   a rotatable work tool, having a center and a circumference;
   an engine that is arranged to propel the rotatable work tool;
   a shielding cover that is arranged to shield a part of the rotatable work tool;
   a first swiveling part that is attached by a first swivel attachment and partly extends either inside or outside the shielding cover, allowing the first swiveling part to pivot around a first swivel axis that crosses the rotatable work tool closer to the center of the rotatable work tool than the circumference of the rotatable work tool; and
   a second swiveling part that is attached to the first swiveling part and partly extends either inside or outside the first swiveling part;
   wherein the second swiveling part is attached to the first swiveling part by a second swivel attachment, allowing the second swiveling part to pivot around a second swivel axis that runs outside the circumference of the rotatable work tool, enabling the first and second swiveling parts to self-adjust to a work surface-such that the amount of dust that enters the shielding cover is increased;
   wherein an edge of the second swiveling part is configured to directly engage with the work surface along a length of the edge of the second swiveling part to capture dust generated by the rotatable work tool acting upon on the work surface, the work surface being a surface upon which the rotatable work tool is acting upon;
   wherein the shielding cover, the first swiveling part, and the second swiveling part are disposed at a rear portion of the rotatable work tool; and
   wherein a forward portion of the rotatable work tool is openly exposed.

2. The engine-driven tool according to claim 1, wherein the second swiveling part comprises a slot that admits clearance for the saw rotatable work tool.

3. The engine-driven tool according to claim 1, wherein both of the first and second swiveling parts have a respective pie-shaped appearance.

4. The engine-driven tool according to claim 1, wherein the shielding cover comprises a dust channel that is formed between the shielding cover and the rotatable work tool, wherein a dust hose is arranged to at least indirectly connect the dust channel to a dust container, where a fan arrangement is arranged to convey air from the dust channel into the dust container via the dust hose.

5. The engine-driven tool according to claim 4, wherein the engine is arranged to propel a first driving pulley comprised in a power transferring unit, wherein the power transferring unit comprises an endless drive belt that is arranged to at least indirectly propel the rotatable work tool when the first driving pulley is propelled, wherein the fan arrangement comprises a fan turbine that is connected to a fan pulley comprised in the power transferring unit, wherein the drive belt is arranged to propel the fan pulley and the fan pulley in turn is arranged to propel the fan turbine.

6. The engine-driven tool according to claim 5, wherein each of the fan pulley and the first driving pulley comprises teeth that engage corresponding belt teeth.

7. The engine-driven tool according to claim 5, wherein when the fan pulley is in a tensioned state, the drive belt is tensioned and arranged to drive both the fan pulley and the rotatable work tool, and when the fan pulley is in a released state, the tension of the drive belt is released.

8. The engine-driven tool according to claim 5, wherein the engine is arranged to propel a first driving pulley via a clutch wheel comprised in a power transferring unit, wherein the first driving pulley and the clutch wheel are arranged to rotate around a common driving axis, and wherein the clutch wheel has an outer edge that is farthest from the driving pulley along the common driving axis, wherein furthermore a first overlap line extends along the outer edge of the clutch wheel, perpendicular to an extension of the common driving axis, the first overlap line further extending via the fan turbine.

9. The engine-driven tool according to claim 1, wherein the second swivel attachment has attached supporting wheels that enable the engine-driven tool to run on the supporting wheels when in operation, and wherein the engine is either a combustion engine or an electric motor.

10. The engine-driven tool according to claim 1, wherein the engine-driven tool comprises a first spring means that is arranged to expose the first swiveling part to a first spring force and a second spring means that is arranged to expose the second swiveling part to a second spring force, wherein each of the first spring force and the second spring force is arranged to extend the corresponding first swiveling part and second swiveling part, respectively, away from the shielding cover.

11. The engine-driven tool according to claim 10, wherein the second spring means is retained by a first rim, formed on the first swiveling part and a second rim formed on the second swiveling part, where the first and second rims are arranged to also provide an enhanced rigidity for the first and second swiveling parts.

12. The engine-driven tool of claim 11, wherein the second swiveling part is independently movable relative to the first swiveling part.

13. The engine-driven tool according to claim 1, wherein the second swiveling part comprises a shaped edge that is arranged to pivot into the shielding cover, wherein said shaped edge has a shape that is optimized for enabling maximal possible pivoting into the shielding cover.

14. The engine-driven tool according to claim 1, wherein the first swiveling part is attached to a saw blade bearing frame by the first swivel attachment.

15. The engine-driven tool of claim 1, wherein the shielding cover, the first swiveling part and the second swiveling part are disposed at a rear portion of the rotatable work tool; and wherein a forward portion of the rotatable work tool is openly exposed.

16. The engine-driven tool of claim 1, wherein the shielding cover, the first swiveling part and the second swiveling part are disposed at a rear portion of the rotatable work tool and a forward portion of the saw blade is openly exposed;

wherein the rear portion of the rotatable work tool is disposed below a plane defined by a position of a throttle switch and an axis of rotation of the rotatable work tool; and wherein the forward portion of the saw blade is disposed above the plane defined by a position of a throttle switch and an axis of rotation of the rotatable work tool.

17. An engine-driven tool comprising:

a rotatable work tool, having a center and a circumference;

an engine that is arranged to propel the rotatable work tool;

a shielding cover that is arranged to shield a part of the rotatable work tool;

a first swiveling part that is attached by a first swivel attachment and partly extends either inside or outside the shielding cover, allowing the first swiveling part to pivot around a first swivel axis that crosses the rotatable work tool closer to the center of the rotatable work tool than the circumference of the rotatable work tool; and a second swiveling part that is attached to the first swiveling part and partly extends either inside or outside the first swiveling part;

wherein the second swiveling part is attached to the first swiveling part by a second swivel attachment, allowing the second swiveling part to pivot around a second swivel axis that runs outside the circumference of the rotatable work tool and through the first and second swiveling parts, enabling the first and second swiveling parts to self-adjust to a work surface such that the amount of dust that enters the shielding cover is increased, the work surface being a surface upon which the rotatable work tool is acting upon;

wherein an edge of the second swiveling part is configured to directly engage with the work surface along a length of the edge of the second swiveling part to capture dust generated by the rotatable work tool acting on the work surface;

wherein the shielding cover, the first swiveling part, and the second swiveling part are disposed at a rear portion of the rotatable work tool; and wherein a forward portion of the rotatable work tool is openly exposed.

18. The engine-driven tool of claim 17, wherein the first swivel axis is offset from the center of the rotatable work tool.

19. The engine-driven tool of claim 17, wherein the first swiveling part has a stop pin configured to prevent over-rotation of the second swiveling part.

20. An engine-driven tool comprising:

a rotatable work tool, having a center and a circumference;

an engine that is arranged to propel the rotatable work tool;

a shielding cover that is arranged to shield a part of the rotatable work tool;

a first swiveling part that is attached by a first swivel attachment and partly extends either inside or outside the shielding cover, allowing the first swiveling part to pivot around a first swivel axis that crosses the rotatable work tool closer to the center of the rotatable work tool than the circumference of the rotatable work tool; and a second swiveling part that is attached to the first swiveling part and partly extends either inside or outside the first swiveling part;

wherein the second swiveling part is attached to the first swiveling part by a second swivel attachment, allowing the second swiveling part to pivot around a second swivel axis that runs outside the circumference of the rotatable work tool, enabling the first and second swiveling parts to self-adjust to a work surface such that the amount of dust that enters the shielding cover is increased, the work surface being a surface upon which the rotatable work tool is acting upon;

wherein the shielding cover, the first swiveling part, and the second swiveling part collectively define a dust channel between the rotatable work tool and interior surfaces of the shielding cover, the first swiveling part, and the second swiveling part that aligns with a dust pipe configured to receive dust generated by the rotatable work tool acting upon the work surface;

wherein an edge of the second swiveling part is configured to directly engage with the work surface along a length of the edge of the second swiveling part to capture dust generated by the rotatable work tool acting on the work surface;

wherein the shielding cover, the first swiveling part, and the second swiveling part are disposed at a rear portion of the rotatable work tool; and wherein a forward portion of the rotatable work tool is openly exposed.

* * * * *